United States Patent Office 3,231,535
Patented Jan. 25, 1966

3,231,535
SACRIFICIAL ANODE COATING
Woodrow E. Kemp, Pittsburgh, Pa., assignor to Koppers Company, Inc., a corporation of Delaware
No Drawing. Filed Aug. 23, 1962, Ser. No. 218,861
5 Claims. (Cl. 260—29.6)

This invention relates generally to the protection of ferrous metallic surfaces and more particularly, to the protection of ferrous metal surfaces by cathodic protection.

Sacrificial anode coatings are widely used to protect iron and steel from corrosion. The sacrificial anode is a metal that is higher in the electromotive series than is iron so that, in electrochemical reactions, this metal becomes the anode and iron the cathode. In such reactions, the anode is sacrificed and the cathode protected. Thus, corrosion of iron does not take place, if it be protected by zinc, as for example, in galvanized sheet.

Zinc dust, because of its cathodic character with respect to iron, if applied as a coating to a ferrous surface, protects the ferrous metal; to some extent, the zinc dust acting like galvanizing. Coating the metal with zinc dust, however, involves problems. Most inorganic coating binders are non-conductive. The sacrificial anode particles themselves, as well as the two metals, anode and cathode, must be able to make electrical contact for cathodic protection to take place. Inorganic coatings have heretofore not provided this adherence for electrical contact.

Inorganic zinc coatings are commercially available, generally as three component systems: (1) a zinc dust component; (2) an alkali silicate component; and (3) a curing component. The zinc dust component is mixed with the silicate component immediately prior to the application of the mixture to the surface; the coating mixture is allowed to dry on the surface for about an hour; and then it is treated with the curing component (usually acid) to render the coating insoluble.

Zinc dust coatings have heretofore suffered from several major deficiencies. First, the coatings must be applied to white metal, that is, to a freshly cleaned and sand-blasted surface free of all contaminants, such as rust and mill scale. Otherwise, poor adhesion is obtained; and the coating fails either immediately by loss of adhesion or the early loss of the electromotive force that provides the protection. The cost of surface preparation has often been as great as the cost of the coating. Secondly, the coating is sensitive to moisture until it is cured with the acid component. Thus, should it rain before the coating is completely cured (which may take a period of several hours) the entire coating must be removed; and the surface again sand-blasted and the procedure repeated.

In accordance with this invention, a novel two-component coating has been discovered, which components include a sacrificial anode and which may be mixed and applied to a ferrous metal surface to protect the surface. A particular advantage of this coating is that the preparation of the surface to which the coating is applied is not critical. It is only necessary that the surface be grease-free. It has been found, for example, that perfect adhesion of the novel coating of this invention is obtained even if the coating be applied to a polished steel surface; the coating of this invention does not require the rough, fresh surface as does the heretofore known coatings. Furthermore, the novel composition does not require the addition of a third component or other subsequent treatment. The composition cures rapidly after its application to the surface; it dries to the touch within ten minutes after application to the surfaces; and it is completely water-resistant after fifteen minutes.

The first component, that is sacrificial anode, is a pigment selected from the class consisting of zinc dust and powdered binary magnesium-zinc alloy. Zinc dust for use in this invention is a metallic zinc pigment that is commercially available in powdered form. The fine grade should be used. Such fine-grade zinc dust has a maximum particle size of 3 microns and an average particle size of about 2 microns. The binary magnesium-zinc alloy usable in this invention is described more in detail in United States Patent No. 2,877,126. Such binary alloy consists of magnesium in an amount between 30 and 15 weight percent and zinc in an amount between 70 and 85 weight percent. The alloy should be in the form of a particulate powder having a size less than 150 microns and preferably less than 50 microns.

The second component, the binder or vehicle, is kept separate from the first component until ready for use. The second component has the appearance of a milky liquid and is comprised of an alkali silicate, an acrylic resin emulsion, and distilled water.

The alkali silicate may be sodium silicate, potassium silicate, or a mixture of such silicates in the form of an aqueous solution. The alkali silicate solution should be one of those which has a high alkali oxide:silica oxide ratio; the minimum mole ratio for potassium silicate ($K_2O:SiO_2$) is 1:3.9 and for sodium silicate ($Na_2O:SiO_2$) is 1:3.75. Such solutions are commercially available, for example, from the Philadelphia Quartz Company as "Kasil No. 1" and "S–35." Such silicates as solids usually comprise about 27% by weight of the aqueous medium.

The acrylic resin emulsion is described in detail in United States Patent No. 2,795,564. Such emulsions are the aqueous dispersions of a water-insoluble interpolymer containing a water-soluble non-ionic polyethoxyethanol emulsifying agent and having a pH between 8 and 10. The interpolymer is comprised of: (1) units having carboxylate groups from at least one polymerizable $\alpha$, $\beta$-unsaturated vinylidene carboxylic acids; (2) units from at least one polymerizable ester which by itself forms soft polymers and which is selected from the class consisting of esters of acrylic acid and primary alkanols of 1 to 18 carbon atoms, esters of acrylic acid and secondary alkanols of 1 to 18 carbon atoms, esters of methacrylic acid and primary alkanols of 5 to 18 carbon atoms, esters of methacrylic acid and secondary alkanols of 5 to 18 carbon atoms; and (3) units from at least one polymerizable monovinylidene compound which by itself forms a hard polymer and which is selected from the class consisting of alkyl methacrylates in which the alkyl group has 1 to 4 carbon atoms, tert-amyl methacrylate, tert-butyl acrylate, tert-amyl acrylate, cyclohexyl acrylate, and cyclohexyl methacrylate. The carboxylate units constitute between 0.5 and 2.5% of the interpolymer; the proportion of units from the soft polymer-forming ester is sufficient to cause the dispersion of interpolymer to form adhesive and cohesive films at an application temperature of about 35° C.; and the ratio of units from said ester to units from the vinylidene compound is between 9:1 and 1:20.

Typical of the foregoing acrylic resin emulsions are those sold under the trademark "Rhoplex AC–33" and "Rhoplex AC–55." "Rhoplex AC–33," for example, is a milky liquid containing about 46% solids; has a viscosity of 25° C. of 60 to 80 ku.; a specific gravity at 25° C. of 1.04; weighs about 8.67 pounds per gallon; and has a pH of 9 to 9.5. "Rhoplex AC–55" has a solids content of 54 to 55 percent, a specific gravity of 1.08 and a milky liquid appearance.

The range of material for manufacturing the inorganic sacrificial anode zinc coatings is (based on 100% by weight of the final composition):

Sacrificial anode powder . 50–70%.
Alkali silicate _____ 10–25% (aqueous medium).
Acrylic resin emulsion ___ 2–10% (aqueous medium).
Distilled water _____ To adjust the viscosity for the mode of application.

The proportion within the above limits is critical. For example, it has been found that if the proportion of anode metal be too little, the metal-to-metal contact, i.e., anode to anode particle and anode particle to iron, is not sufficient; but if the proportion be too great, not enough binder is present to hold the anode particles together or to the cathode metal. It has also been found that the higher the ratio of the silicon dioxide to alkali metal oxide in the alkali silicate, the better is the material. It has further been found that if the proportions of alkali silicate and acrylic resin emulsion are not within the foregoing limits, the material does not adhere well to the surface, becomes brittle and spalls and may even become water-sensitive.

A typical composition may be made, for example, by mixing 75 parts of zinc dust with 10 parts of a 27% aqueous potassium silicate medium, 2 parts of a 46% solids aqueous acrylate resin emulsion and 13 parts of water. Another composition could involve 50 parts of zinc dust with 25 parts of a 27% aqueous potassium silicate medium, 10 parts of a 46% solids aqueous acrylate resin emulsion and 15 parts of water.

Until ready for use, each component of the composition is kept in a separate container, one container for the anode particles, the other container for the binder. The two components are then mixed; and the mixture is applied to metal in a conventional manner to coat the metal with a light gray film. The composition is particularly advantageous for spray coating. It should be used within three hours after the components are mixed as some attack starts on the anode particles after this time and some hydrogen seems to be evolved.

The coating film preferably should be one coat that is advantageously less than 5 mils and preferably about 2–3 mils in thickness. The coating film is light gray in color. The dried film will contain between about 96–87 percent of sacrificial anode metal, 2–8 percent of alkali-metal silicate, and 1–5 percent of acrylic resin. If desired, the novel coating of this invention may be overcoated with any alkali-resistant organic coating such, for example, as those having epoxide, urethane and chlorinated rubber bases.

The following examples will further illustrate the benefits and advantages obtained by this invention:

*Example I*

The binder component is made by mixing 15.1 parts of potassium silicate having a molecular ratio $K_2O:SiO_2$ of 1:3.9 (Kasil No. 1) with 5.6 parts of an acrylic resin emulsion ("Rhoplex AC–33") and 11.3 parts of distilled water. With this binder is then mixed 60 parts of zinc dust having an average particle size of 2 microns. This, then, provides a hundred parts of coating composition. The coating composition is sprayed on sheets of grease-free mild steel to a film thickness of 3 mils. The coating dries to touch in ten minutes and becomes water-insoluble in fifteen to thirty minutes.

The coating has been found to withstand temperatures between −100° C. and +800° C. and to provide cathodic protection to a steel surface for a period of at least two years when the surface is in complete immersion in a conductive liquid and to provide cathodic protection when the surface is exposed to atmosphere or periodic contact with a conductive liquid for a much longer period. A specimen of the coated steel (the coating applied to grease-free cold rolled surface) tested in a conventional manner in a salt-vapor cabinet for 1,000 hours, shows no deterioration of the surface; and no rusting of the metal takes place. Also, when the coated metal is bent through an angle of 180° over a quarter inch mandrel, after the coating has set for three days, no cracking of the coating takes place. Under a conventional impact-resistance test where a two-pound weight is dropped eight feet, there is no shattering of the film. This adhesion is remarkable for an inorganic coating.

The coating composition was applied to a mild steel surface at the rate of one gallon per 400 square feet to give a resulting film of approximately 3 mils in thickness. The amount of zinc present was then roughly about one ounce per square foot. A specimen of this coated surface was compared with a specimen of a commercial galvanized sheet of steel having zinc galvanized thereon at the rate of about one ounce per square foot. The surfaces of both specimens were scratched to a scar a width of $\frac{1}{32}$ of an inch. After 1000 hours' exposure in a Standard ASTM Salt-Fog-Cabinet, the galvanized specimen exhibited gross rusting in the scar mark, whereas the specimen with inorganic coating of this invention showed no rusting. In fact, the corrosion products resulting from the coating of this invention tended to heal the scratch by deposition of a grayish-white zinc oxide-silicate-matrix thus preventing further electrical drain on the anode metal.

*Example II*

The binder component is made by blending 47.2 parts by weight of potassium silicate solution (29% solids) having a molecular ratio $K_2O:SiO_2$ of 1:3.92 with 17.5 parts by weight of an acrylic resin emulsion (Rhoplex AC–55) and 53.3 parts by weight of distilled water. Thereafter, 32 parts by weight of this binder are blended with 68 parts by weight of zinc dust whose particle size is 2–3 microns, and the resultant composition applied to a clean steel surface. The dried film coupled to steel generates a cathodic current greater than 70% of the value obtained from a pure zinc couple. This coating sets up rapidly (one hour at 70° F. to 5 min. at 120° F.). It is insoluble in all common organic solvents. It is noninflammable. It will bond to normal steel surfaces. It is also temperature resistant.

*Example III*

A binder is made in accordance with Example II. A composition is made by blending 30 parts by weight of the binder with 70 parts by weight of a powdered binary zinc-magnesium alloy made in accordance with Patent No. 2,877,126, the alloy containing 75 percent by weight of zinc and 25 percent by weight of magnesium. The advantage of this composition is the high cathodic current generated for the protection of the ferrous surface.

*Example IV*

A composition made in accordance with Example I except substituting sodium silicate having a mole ratio ($Na_2O:SiO_2$) of 1:375 (S–35) for the potassium silicate, showed comparable results.

Pure magnesium powder or alloys containing more than 40 percent of magnesium cannot be used in the practice of this invention because of the excessive reactivity of the magnesium with the silicate.

The foregoing has presented a novel sacrificial anode type coating which can be applied to a ferrous metal surface without special treatment of the surface, the coating adheres well to the surface, is flexible, is temperature and chemical resistant and provides excellent long-time protection for the surface.

I claim:
1. A quick-drying coating composition for the protection of a ferrous metal surface comprising 68 parts of zinc dust having an average particle size of about 2 microns, 15 parts of an alkali silicate solution, 5 parts of a film-forming acrylic resin emulsion wherein the resin is an interpolymer comprised of: (1) units having carboxylate groups from at least one polymerizable α,β-unsaturated vinylidene carboxylic acid, (2) units from at least one polymerizable ester which by itself forms soft polymers and which is selected from the class consisting of esters of acrylic acid and primary alkanols of 1 to 18 carbon atoms, esters of acrylic acid and secondary alkanols of 1 to 18 carbon atoms, esters of methacrylic acid and primary alkanols of 5 to 18 carbon atoms, esters of methacrylic acid and secondary alkanols of 5 to 18 carbon atoms, and (3) units from at least one polymerizable monovinylidene compound which by itself forms a hard polymer and which is selected from the class consisting of alkyl methacrylates in which the alkyl group has 1 to 4 carbon atoms, tert-amyl methacrylate, tert-butyl acrylate, tert-amyl acrylate, cyclohexyl acrylate, and cyclohexyl methacrylate with the carboxylate units constituting between 0.5 and 2.5% of the interpolymer and the proportion of units from the soft polymer-forming ester being sufficient to cause the dispersion of interpolymer to form adhesive and cohesive films at an application temperature of about 35° C. and the ratio of units from said ester to units from the vinylidene compound being between 9:1 and 1:20, and 12 parts of distilled water, said composition providing contact between the individual particles of zinc dust and between the zinc dust and said ferrous metal surface whereby an electrochemical action takes place to provide cathodic protection for said ferrous metal surface by oxidation of said zinc dust.

2. A quick-drying coating composition as a sacrificial cathode for the protection of a ferrous metal surface comprising: an admixture of components A and B, component A being an anode metal powder selected from the class consisting of zinc dust and magnesium-zinc alloy particles having between 70 and 85 weight percent of zinc and between 30 and 15 weight percent of magnesium, component B being a binder consisting essentially of 10 to 25 percent of an alkali silicate solution, 2 to 10 percent of a film-forming acrylic resin emulsion wherein the resin is an interpolymer comprised of: (1) units having carboxylate groups from at least one polymerizable α,β-unsaturated vinylidene carboxylic acid, (2) units from at least one polymerizable ester which by itself forms soft polymers and which is selected from the class consisting of esters of acrylic acid and primary alkanols of 1 to 18 carbon atoms, esters of acrylic acid and secondary alkanols of 1 to 18 carbon atoms, esters of methacrylic acid and primary alkanols of 5 to 18 carbon atoms, esters of methacrylic acid and secondary alkanols of 5 to 18 carbon atoms, and (3) units from at least one polymerizable monovinylidene compound which by itself forms a hard polymer and which is selected from the class consisting of alkyl methacrylates in which the alkyl group has 1 to 4 carbon atoms, tert-amyl methacrylate, tert-butyl acrylate, tert-amyl acrylate, cyclohexyl acrylate, and cyclohexyl methacrylate with the carboxylate units constituting between 0.5 and 2.5% of the interpolymer and the proportion of units from the soft polymer-forming ester being sufficient to cause the dispersion of interpolymer to form adhesive and cohesive films at an application temperature of about 35° C. and the ratio of units from said ester to units from the vinylidene compound being between 9:1 and 1:20, and sufficient distilled water to adjust the viscosity to that desired for the mode of application of the coating to the surface, the components A and B being mixed just prior to their use as a coating.

3. A method of protecting a ferrous metal surface which comprises: admixing an anode metal powder selected from the class consisting of zinc dust and magnesium-zinc alloy particles having between 70 and 85 weight percent of zinc and between 30 and 15 weight percent of magnesium with a binder consisting essentially of 10 to 25 percent of an alkali silicate solution, 2 to 10 percent of a film-forming acrylic resin emulsion wherein the resin is an interpolymer comprised of: (1) units having carboxylate groups from at least one polymerizable α,β-unsaturated vinylidene carboxylic acid, (2) units from at least one polymerizable ester which by itself forms soft polymers and which is selected from the class consisting of esters of acrylic acid and primary alkanols of 1 to 18 carbon atoms, esters of acrylic acid and secondary alkanols of 1 to 18 carbon atoms, esters of methacrylic acid and primary alkanols of 5 to 18 carbon atoms, esters of methacrylic acid and secondary alkanols of 5 to 18 carbon atoms, and (3) units from at least one polymerizable monovinylidene compound which by itself forms a hard polymer and which is selected from the class consisting of alkyl methacrylates in which the alkyl group has 1 to 4 carbon atoms, tert-amyl methacrylate, tert-butyl acrylate, tert-amyl acrylate, cyclohexyl acrylate, and cyclohexyl methacrylate with the carboxylate units constituting between 0.5 and 2.5% of the interpolymer and the proportion of units from the soft polymer-forming ester being sufficient to cause the dispersion of interpolymer to form adhesive and cohesive films at an application temperature of about 35° C. and the ratio of units from said ester to units from the vinylidene compound being between 9:1 and 1:20, and sufficient distilled water to adjust the viscosity to that desired, and applying said admixture to said ferrous metal surface.

4. A quick-drying sacrificial anode coating composition for the protection of a ferrous metal surface comprising: an admixture of a metal powder selected from the class consisting of zinc dust and a binary magnesium-zinc alloy having between 70 and 85 weight percent of zinc and between 30 and 15 weight percent of magnesium, and a binder consisting essentially of an alkali silicate solution, a film-forming acrylic resin emulsion wherein the resin is an interpolymer comprised of: (1) units having carboxylate groups from at least one polymerizable α,β-unsaturated vinylidene carboxylic acid, (2) units from at least one polymerizable ester which by itself forms soft polymers and which is selected from the class consisting of esters of acrylic acid and primary alkanols of 1 to 18 carbon atoms, esters of acrylic acid and secondary alkanols of 1 to 18 carbon atoms, esters of methacrylic acid and primary alkanols of 5 to 18 carbon atoms, esters of methacrylic acid and secondary alkanols of 5 to 18 carbon atoms, and (3) units from at least one polymerizable monovinylidene compound which by itself forms a hard polymer and which is selected from the class consisting of alkyl methacrylates in which the alkyl group has 1 to 4 carbon atoms, tert-amyl methacrylate, tert-butyl acrylate, tert-amyl acrylate, cyclohexyl acrylate, and cyclohexyl methacrylate with the carboxylate units constituting between 0.5 and 2.5% of the interpolymer and the proportion of units from the soft polymer-forming ester being sufficient to cause the dispersion of interpolymer to form adhesive and cohesive films at an application temperature of about 35° C. and the ratio of units from said ester to units from the vinylidene compound being between 9:1 and 1:20, and sufficient distilled water to adjust the viscosity for application of the coating to said surface.

5. A method of protecting a ferrous metal surface which comprises: admixing an anode metal powder selected from the class consisting of zinc dust and magnesium-zinc alloy particles having between 70 and 85 weight percent of zinc and between 30 and 15 weight percent of magnesium with a binder consisting essentially of an alkali of 10 to 25 percent of an alkali metal silicate solution, 2 to 10 percent of a film-forming acrylic resin emulsion wherein the resin is an interpolymer comprised of: (1) units having carboxylate groups from at least one polymerizable α,β-unsaturated vinylidene carboxylic acid, (2) units from at least one polymerizable ester which by itself forms soft polymers and which is selected from the class consisting of esters of acrylic acid and primary alkanols of 1 to 18 carbon atoms, esters of acrylic acid and secondary alkanols of 1 to 18 carbon atoms, esters of methacrylic acid and primary alkanols of 5 to 18 carbon atoms, esters of methacrylic acid and secondary alkanols of 5 to 18 carbon atoms, and (3) units from at least one polymerizable monovinylidene compound which by itself forms a hard polymer and which is selected from the class consisting of alkyl methacrylates in which the alkyl group has 1 to 4 carbon atoms, tert-amyl methacrylate, tert-butyl acrylate, tert-amyl acrylate, cyclohexyl acrylate, and cyclohexyl methacrylate with the carboxylate units constituting between 0.5 and 2.5% of the interpolymer and the proportion of units from the soft polymer-forming ester being sufficient to cause the dispersion of interpolymer to form adhesive and cohesive films at an application temperature of about 35° C. and the ratio of units from said ester to units from the vinylidene compound being between 9:1 and 1:20, and sufficient distilled water to adjust the viscosity to that desired, and applying said admixture to said ferrous metal surface to provide on said surface a coating which dries to the touch within ten minutes to provide a film containing between about 96 and 87 percent of anode metal, 2–8 percent of an alkali metal silicate, and 1–5 percent of acrylic resin.

References Cited by the Examiner

UNITED STATES PATENTS

| | | | |
|---|---|---|---|
| 2,930,771 | 3/1960 | Wade | 260—29.6 |
| 2,946,695 | 7/1960 | Dietz et al. | 260—29.6 |
| 3,053,693 | 9/1962 | Schuster et al. | 106—14 |
| 3,093,493 | 6/1963 | Von Freyhold | 106—84 |

FOREIGN PATENTS 1,062,856  8/1959  Germany.

MURRAY TILLMAN, *Primary Examiner.*

DONALD E. CZAJA, *Examiner.*

E. B. WOODRUFF, *Assistant Examiner.*